(12) United States Patent
Pinson

(10) Patent No.: US 8,954,320 B2
(45) Date of Patent: Feb. 10, 2015

(54) SYSTEM AND METHOD FOR NOISE REDUCTION IN PROCESSING SPEECH SIGNALS BY TARGETING SPEECH AND DISREGARDING NOISE

(75) Inventor: Mark Pinson, Pleasant Grove, UT (US)

(73) Assignee: SCTI Holdings, Inc., Silver Springs, MD (US)

( * ) Notice: Subject to any disclaimer, the term of this patent is extended or adjusted under 35 U.S.C. 154(b) by 273 days.

(21) Appl. No.: 13/387,058

(22) PCT Filed: Jul. 27, 2010

(86) PCT No.: PCT/US2010/043400
§ 371 (c)(1),
(2), (4) Date: Apr. 6, 2012

(87) PCT Pub. No.: WO2011/014512
PCT Pub. Date: Feb. 3, 2011

(65) Prior Publication Data
US 2012/0191450 A1    Jul. 26, 2012

Related U.S. Application Data

(60) Provisional application No. 61/228,925, filed on Jul. 27, 2009.

(51) Int. Cl.
*G10L 21/00* (2013.01)
*G10L 25/90* (2013.01)
*G10L 19/00* (2013.01)
*G10L 21/0208* (2013.01)

(52) U.S. Cl.
CPC ................ *G10L 21/0208* (2013.01)
USPC .......... 704/207; 704/205; 704/200.1

(58) Field of Classification Search
USPC ............ 704/200–230, 500–504
See application file for complete search history.

(56) References Cited

U.S. PATENT DOCUMENTS

| 5,414,796 | A  | * | 5/1995 | Jacobs et al. | 704/221 |
|---|---|---|---|---|---|
| 6,925,435 | B1 | * | 8/2005 | Gao | 704/220 |
| 7,792,680 | B2 | * | 9/2010 | Iser et al. | 704/500 |
| 2001/0018650 | A1 | * | 8/2001 | DeJaco | 704/200.1 |
| 2003/0055646 | A1 | * | 3/2003 | Yoshioka et al. | 704/258 |
| 2005/0065792 | A1 | * | 3/2005 | Gao | 704/233 |
| 2009/0112579 | A1 | * | 4/2009 | Li et al. | 704/205 |

* cited by examiner

*Primary Examiner* — Jesse Pullias
(74) *Attorney, Agent, or Firm* — Michael A. Glenn; Perkins Coie LLP

(57) ABSTRACT

An exemplary noise reduction system and method processes a speech signal that is delivered in a noisy channel or with ambient noise. Some exemplary embodiments of the system and method use filters to extract speech information, and focus on a subset of harmonics that are least corrupted by noise. Some exemplary embodiments disregard signal harmonics with low signal-to-noise ratio(s), and disregard amplitude modulations that are inconsistent with speech. An exemplary system and method processes a signal that focuses on a subset of harmonics that are least corrupted by noise, disregards the signal harmonics with low signal-to-noise ratio(s), and disregards amplitude modulations that are inconsistent with speech.

20 Claims, 5 Drawing Sheets

SYSTEM AND METHOD FOR NOISE REDUCTION IN PROCESSING SPEECH SIGNALS BY TARGETING SPEECH AND DISREGARDING NOISE

CROSS REFERENCE TO RELATED APPLICATIONS

This application is a U.S. National Entry from PCT Patent Application No. PCT/US10/43400 filed 27 Jul. 2010, which claims priority to U.S. Patent Application No. 61/228,925 filed 27 Jul. 2009, both of which are incorporated herein in their entirety by this reference thereto.

BACKGROUND OF THE INVENTION

1. Technical Field

The invention relates to noise reduction in processing speech signals.

More specifically, the invention relates to using adaptive filters to extract speech information from a speech signal containing noise.

2. Description of the Related Art

Automatic speech recognition systems ("ASR") convert audio signals containing spoken words to text. The "front ends" of such systems initiate the conversion process by extracting critical identifying speech "features" from a targeted speech signal. The feature-extraction performance of ASR systems degrades significantly when the targeted speech signal is corrupted by noise. Indeed, noise hinders the widespread use of ASR systems in many otherwise practical applications. The same is true of any other communication or auditory system which employs the spoken word as input and processes that signal for the purpose of making it more clearly heard or understood, such as hearing aids, head phones, or radio, wire or internet-based voice communications.

Current noise-reduction systems attempt to mitigate noise by modeling it and subtracting it from the signal. These systems require an accurate estimation of the noise signal. However, accurate estimation is extremely difficult because the noise signals are non-stationary and these techniques fail or limit their effectiveness when the noise is different from the model or if the noise varies over time.

Other methods rely on training models that attempt to train an ASR system to recognize noise-corrupted speech. However, the magnitude of environmental noise and system noise often is too large or too dynamic to produce training models having requisite reliability.

Finally, others have attempted to utilize the harmonic nature of speech to improve speech recognition. However, prior attempts to detect and track the harmonic structure of speech have been inadequate.

SUMMARY OF THE INVENTION

The invention relates to a system and method for using filters to extract speech information from a noisy signal that contains human speech and disregarding portions of the extracted materials that do not carry speech information.

Some embodiments of the invention involve focusing on a subset of harmonics that are least corrupted by noise. Some embodiments of the invention involve ignoring the signal harmonics with low signal-to-noise ratio(s). Some embodiments involve disregarding amplitude modulations inconsistent with speech. The presently preferred embodiment of the invention involves system of processing a signal that focuses on a subset of harmonics that are least corrupted by noise, disregards the signal harmonics with low signal-to-noise ratio (s), and disregards amplitude modulations inconsistent with speech.

Some embodiments of the invention involve a system having a processor comprising a plurality of processing modules for performing automatic speech extraction. In the presently preferred embodiments, a processor comprises a harmonic frequency identifier, an adaptive filter applicator, a modulator, a power ratio constructor, a low-power harmonic remover, and a non-speech harmonic remover, wherein the modules are configured for processing a signal in such a manner as to focus on a subset of harmonics that are least corrupted by noise, to disregard the signal harmonics with low signal-to-noise ratio(s), and to disregard amplitude modulations inconsistent with speech.

DETAILED DESCRIPTION OF THE INVENTION

As explained above, many prior attempts to create systems for processing computer-recognizable speech are centered on modeling and removing noise and fail when the noise conditions vary from their models. Indeed, for this reason, among others, no state-of-the-art ASR system is anywhere close to human performance. The same is true of other systems which use voice inputs, such as hearing aids, and radio, wire, and internet-based voice communications systems.

Humans, on the other hand, can reliably understand speech in moderate amounts of many different types of noise and under time-variable conditions. Humans counter noise in a noisy speech signal not by removing the noise but by disregarding it and focusing more intensively and selectively on the relevant aspects of the speech information signal. The aim of our approach to noise reduction is to more closely approximate human performance than state-of-the-art noise reduction techniques do.

A speech signal is composed of a harmonic structure consisting of a fundamental frequency, i.e., the "pitch", and integer multiples of the fundamental frequency, i.e., the "harmonics". Voiced speech exhibits harmonic structure with energy concentrations at the pitch and the harmonics. This means that the energy in voiced speech is concentrated in the frequency of the pitch and its integer multiple harmonic frequencies.

The invention is a system and method of detecting and tracking this harmonic structure, whereby the aspects of the signal most relevant to speech understanding is extracted.

The inventor has observed that the pitch and its harmonics have the highest local signal-to-noise ratios because the concentration of relevant energy exists in the harmonics. This means that, as noise levels are increased, the harmonics are the last aspects of the signal to stand out above the noise. Amplitude modulations of the harmonics encode the information used for speech perception. The information is encoded somewhat redundantly. Therefore, the speech information is conveyed by reliance on only a subset of the harmonics.

Focusing on a subset of harmonics further enhances the ability of humans to understand speech because the message can be received by selective attention to the harmonics which are least corrupted by noise. The presently preferred embodiments of the invention replicate this ability to selectively focus on the subset of harmonics that are least corrupted by noise.

For the purpose of this invention, the term "noise" shall refer to any unwanted sound in a voice signal including, but not limited to, ambient noise, channel noise, and combinations thereof.

There are many methods which allow selective focus on less corrupted harmonics. These methods can be used separately or in combination to selectively focus on a subset of harmonics. These methods are explained in more detail below.

Figure 1A:
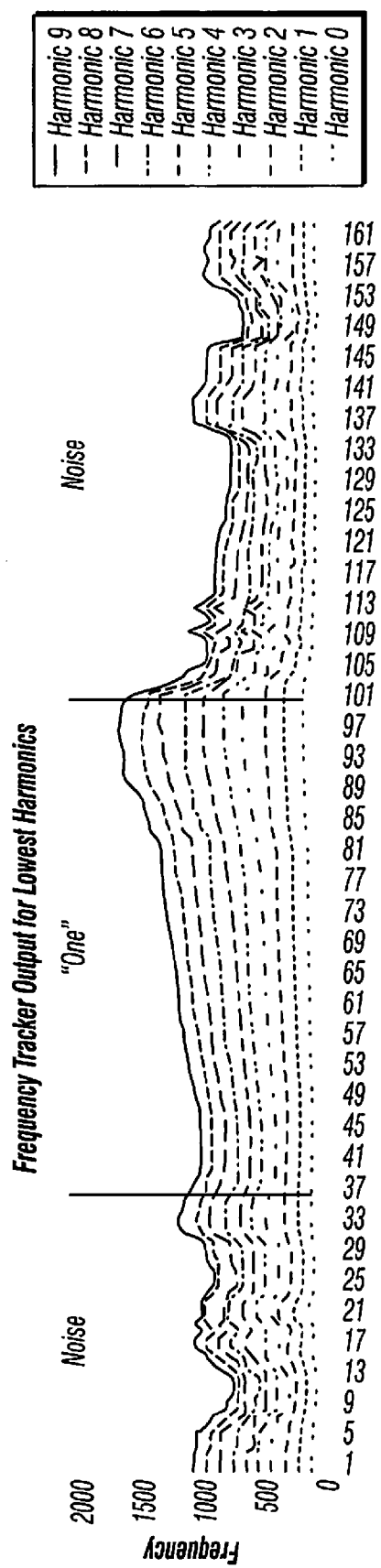
FIG. 1A is a graph plotting the frequency over time of a human speaker uttering a word containing information stored in its pitch and a subset of its harmonics according to some embodiments of the invention.
Figure 1B:
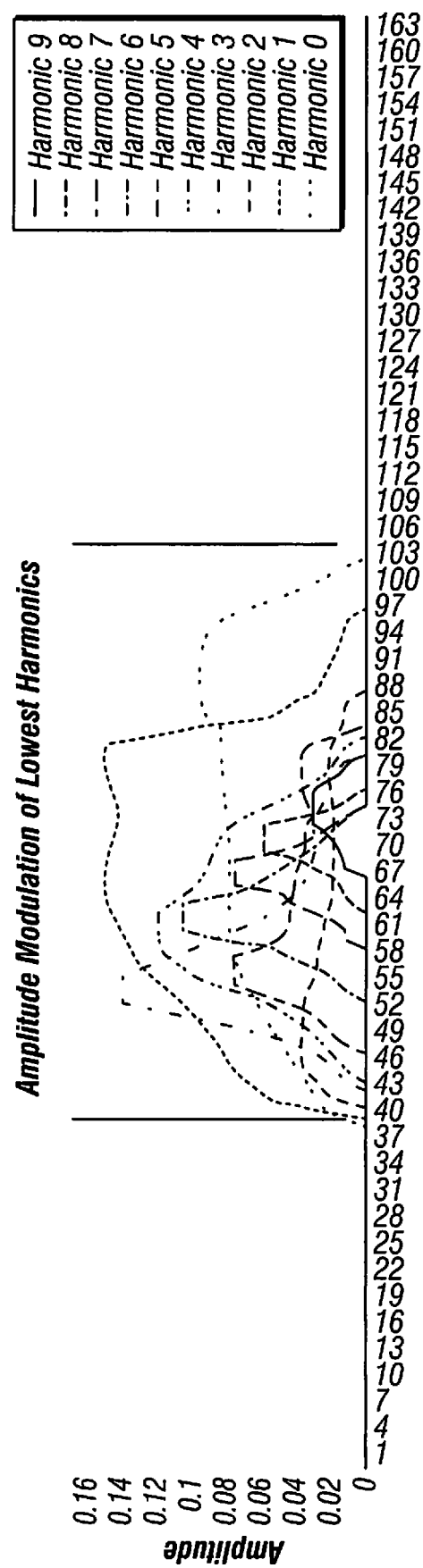
FIG. 1B is a graph plotting the value of the amplitude modulation of the speech signal harmonics over time according to some embodiments of the invention.

FIGS. 1A and 1B illustrate the harmonic structure of voiced-speech and an amplitude modulation of the harmonics of a speech signal that illustrates how a subset of the harmonics convey the majority of the speech information.

FIG. 1A is a graph plotting the frequency over time of a human speaker uttering the word "one". As shown, the word "one" starts at time index 37 and runs to time index 102. The harmonic structure of the voiced speech is clearly evident.

As explained above, an amplitude modulation of a speech signal provides information about which harmonics carry the most speech information. FIG. 1B is a graph plotting the value of the amplitude modulation of the speech signal harmonics over the time of the above utterance of the word "one". As shown in FIG. 1B, the patterns of amplitude modulations represent the speech sounds. For example, only the lowest harmonics have significant energy during the "n sound" at the end of the word.

As explained above, focusing on a subset of harmonics further enhances the ability of humans to understand speech because the message can be received by selective attention to the harmonics which are least corrupted by noise. Likewise, the presently preferred embodiments of the invention involve a system and method reconstructing speech from a reliable subset of harmonics.

The modulations of the harmonics are caused by the changing configurations of the vocal tract as speech is produced. The inventor has observed that the amplitude modulations of the harmonics which encode speech information are very slow: approximately 16 Hz.

Noise which modulates the harmonic amplitudes more rapidly than about 16 Hz can therefore be ignored due to the observation that modulation rates above 16 Hz are not consistent with a speech source and therefore can be filtered out.

The presently preferred embodiment of the invention involves a system and method of reducing noise through three separate mechanisms. First, all non-harmonic energy is disregarded. Next, the signal harmonics with low signal-to-noise ratios are disregarded. Finally, amplitude modulations inconsistent with speech are disregarded.

Figure 2:
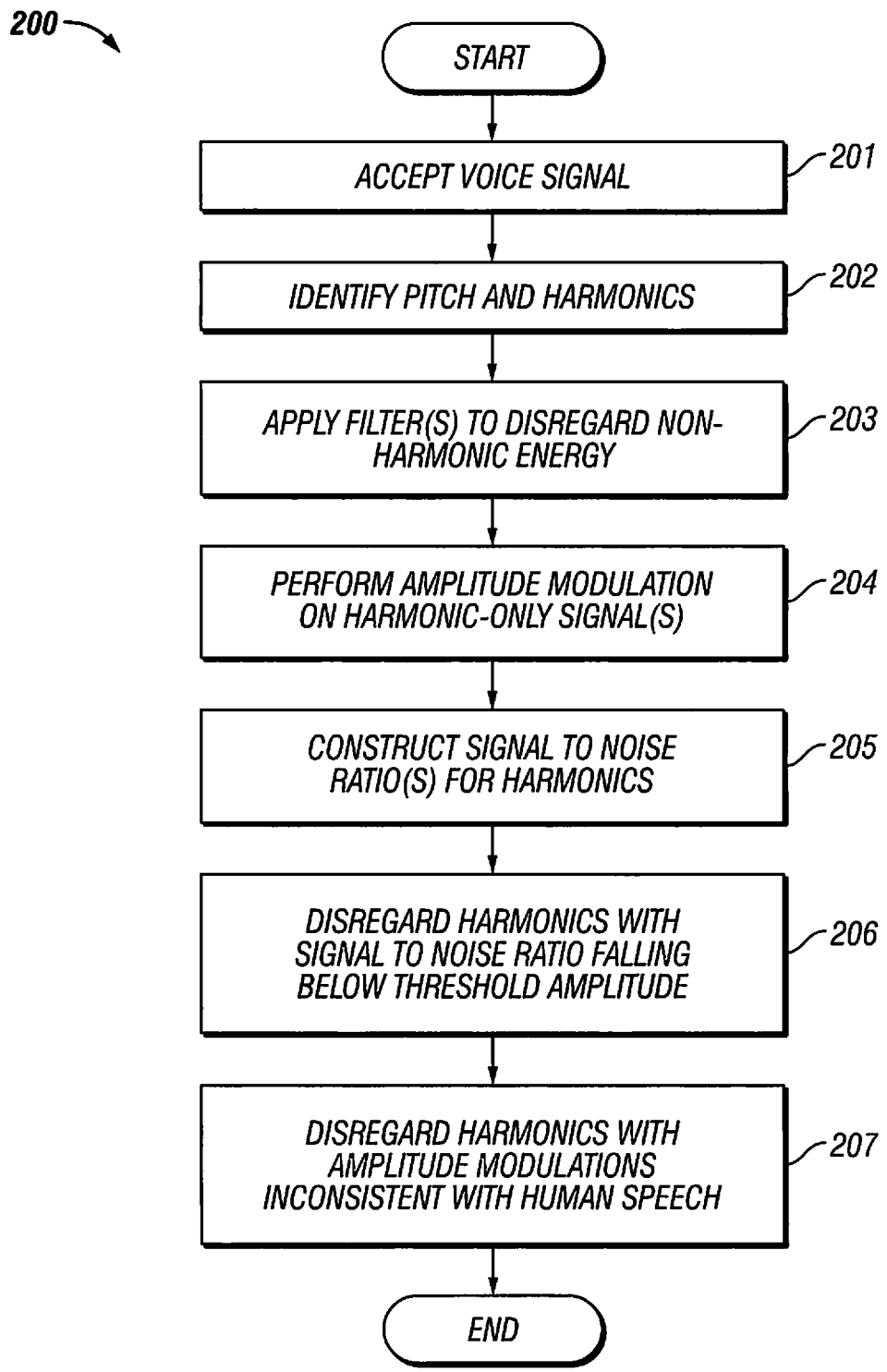
FIG. 2 illustrates a method of automatic speech extraction according to the presently preferred embodiments of the invention.

FIG. 2 illustrates a method 200 of automatic speech extraction according to the presently preferred embodiments of the invention. The method 200 begins with transmission and acceptance of a voice signal in an automatic speech recognition system 201. Next, the pitch of the voice signal is identified, along with its harmonic frequencies 202.

The pitch of the voice signal is identified by processing the inherent characteristics of the signal itself. During voiced speech, a strong harmonic pattern is exhibited. The harmonics are integer multiples of the pitch. A set of adaptive narrow band filters are used to track the locally strongest energy concentrations across the spectrum. These filters will lock onto the harmonics and other strong narrow frequency signals. The locked-on frequencies are examined to select frequencies consistent with a harmonic series. The pitch is determined as the base of the harmonic series. Indeed, it is not necessary to have a filter locked onto the fundamental to determine the pitch.

In the incoming speech signal, the harmonics are amplitude modulated by the person speaking. By isolating the harmonics and their amplitude modulations which are consistent with a speech source, we capture much of the relevant speech information while ignoring much of the irrelevant noise. To reconstruct a signal with much of the noise removed, we would modulate each of the selected harmonics with their own extracted amplitude pattern after the amplitude pattern has been band pass filtered between 1 Hz and 16 Hz to remove modulations which are inconsistent with a speech source.

Once the fundamental frequency and its harmonics are identified, one or more filters are applied to the signal to disregard non-harmonic energy 203. The adaptive narrow band filters by virtue of their narrow bands attenuating non-harmonic energy. The adaptive filters use a process to estimate the instantaneous frequency and amplitude from their output. A narrow band filter is generated with a center frequency equal to the estimate. The instantaneous frequency and amplitude of the output of this frequency is computed to provide a more precise estimate. In some embodiments of the invention, the process of refinement may be repeated for more cycles until the output stabilizes. The final estimates are used as center frequencies for the wide filters in the next time step to track the harmonic components.

Next, the harmonic-only signal is modulated 204. In the presently preferred embodiment, the step of modulation 204 comprises amplitude modulation.

The method 200 continues with constructing signal-to noise-ratio(s) for the amplitude-modulated harmonic signals 205 and disregarding harmonics with a signal-to noise-ratio falling below a given threshold amplitude 206 to focus attention on the harmonics which are least corrupted by noise.

As explained above, there are many methods which allow selective focus on less-corrupted harmonics. These methods can be used separately or in combination to selectively focus on a subset of harmonics.

In some embodiments of the invention, the system ignores noise-corrupted harmonics by taking advantage of the fact that the spectral signal-to-noise ratio is high for uncorrupted harmonics. These embodiments involve defining a narrow and wide band both centered on the harmonic. In some embodiments, the wide band extends outward in both directions from the pitch to a predetermined distance away from the pitch. In some embodiments, the wide band extends at percentage distances to the next-lower harmonic and next-higher harmonic. Preferably, the wide band extends from substantially halfway to the next-lower harmonic frequency to substantially halfway to the next-higher harmonic frequency, wherein substantially halfway includes distances between 40% and 60% the distance to the nearest harmonic. In some other embodiments, the wide band extends exactly halfway to the next-lower harmonic frequency and exactly halfway to the next-higher harmonic frequency Also, the narrow band's bandwidth is preferably determined by the tracking filter; however, the bandwidth will be less than the wide band's bandwidth. In an uncorrupted speech signal, almost all of the energy is concentrated near the harmonic.

Therefore, a function related to the signal-to-noise ratio in the vicinity of the harmonic can be computed as the ratio of energy in the narrow band to energy in the wide band. Accordingly, the step of ignoring harmonics with a signal-to-noise ratio falling below a given threshold amplitude involves ignoring harmonics whose ratio of energy in the narrow band to energy in the wide band is higher than a predetermined threshold value.

In some embodiments of the invention, the predetermined threshold value is selected based on desired performance of the system.

In some other embodiments of the invention, the system ignores noise-corrupted harmonics by taking advantage of the observation that the estimated frequency of each harmonic is influenced by noise components near the frequency of the harmonic. The noise will "pull" the harmonic estimate. As the frequency relationships of a harmonic series are fixed, for any given harmonic, reference to the remaining harmonics can be used to compute the "expected" frequency of the harmonic. Deviation of the harmonic estimate from its expected value is a measure of corruption in the vicinity of the harmonic.

Therefore, some embodiments of the invention involve estimating the frequency of the harmonics based on the pitch, determining the actual frequency the harmonics observed by analyzing the signal, determining a deviation value between the estimated frequency and the actual frequency observed, attributing the deviation to noise, and ignoring harmonic whose deviation value exceeds a predetermined value.

Finally, in the presently preferred embodiments of the invention, the method disregards noise-corrupted harmonics by using the ratio of energy in the narrow band to energy in the wide band and by using deviation from an expected value is used in concert to selectively focus on less corrupted harmonics.

Finally, the method 200 selectively disregards the remaining amplitude modulation signals which are inconsistent with human speech 207. In some embodiments, amplitude modulations which are inconsistent with human speech are suppressed by passing the extracted amplitude patterns through a band pass filter having a range characteristic of human speech. Preferably, the band pass filter has a range of 1 Hz to 16 Hz.

The end result of the method 200 of speech signal recognition is an audio signal free from noise and non-essential recognition information that is replicated to closely match the essential components of the original signal.

The prior art approaches to feature extraction for speech recognition and other voice signal processing uses do not use the disclosed steps of the method 200 to separate speech information from noise.

On the other hand, the method 200 demonstrates reliable tracking under significant levels of noise. For example, FIGS. 3A through 3C illustrate spectrograms of signals showing the benefits of the invention.

Figure 3A:
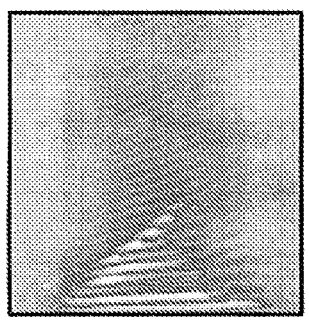
FIG. 3A illustrates a spectrogram of an original voice signal.
Figure 3B:
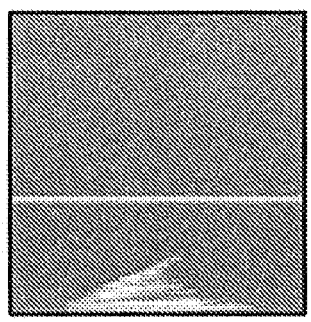
FIG. 3B illustrates a spectrogram of the voice signal with a noise component added.
Figure 3C:
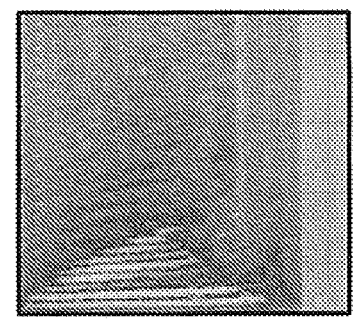
FIG. 3C illustrates a spectrogram of a speech conversion reconstruction of the voice signal according to some embodiments of the invention.

FIG. 3A illustrates a spectrogram of an original voice signal. FIG. 3B illustrates a spectrogram of the voice signal with a noise component added. Finally, FIG. 3C illustrates a spectrogram of a speech conversion reconstruction of the voice signal according to some embodiments of the invention. As shown, the reconstruction accurately reproduces the speech signal without the noise component.

In some embodiments of the invention, a system of automatic speech extraction includes a signal processor that is configured to utilize the method 200 for performing automatic speech extraction.

Figure 4A:
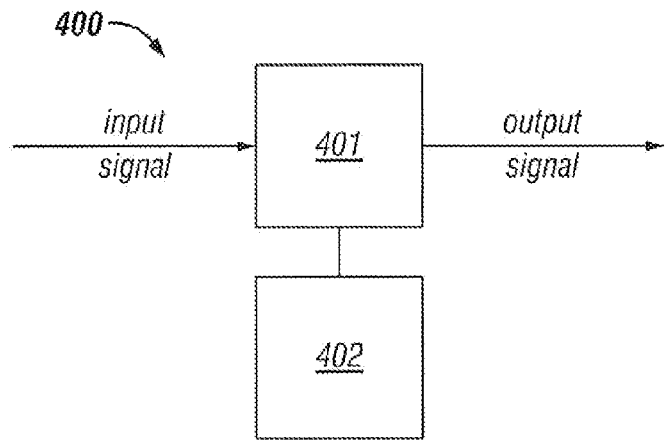
FIG. 4A illustrates a system of automatic speech extraction according to some embodiments of the invention.

FIG. 4A illustrates a basic system of automatic speech extraction 400 according to some embodiments of the invention. According to FIG. 4A, an input signal is sent to processor 401 coupled with a memory 402. In the presently preferred embodiment of the invention, the processor 401 is configured to perform the method of FIG. 2. Also in the pres ently preferred embodiments of the invention, the processor 401 comprises a plurality of processing modules configured for performing the various performing steps required.

The system 400 of FIG. 4A may be incorporated into any automatic speech recognition, as well as any other system or device which utilizes the spoken word as input which suffers from noise corruption, including, but not limited to, hearing aids; head phones, or voice communication by wire, radio or internet, including air-to-air and ground-to-air communications.

Figure 4B:
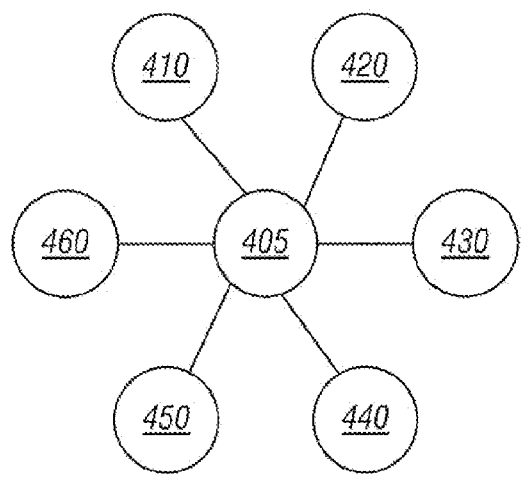
FIG. 4B illustrates a processing engine comprising a plurality of processing modules for performing automatic speech extraction according to the presently preferred embodiments of the invention.

FIG. 4B illustrates a processing engine 405 comprising a plurality of processing modules for performing automatic speech extraction according to the presently preferred embodiments of the invention. According to FIG. 4B, the processing engine 405 comprises a harmonic frequency identifier 410, an adaptive filter applicator 420, a modulator 430, a power ratio constructor 440, a low power harmonic remover 450, and a non-speech harmonic remover 460. According to the presently preferred embodiments of the invention, the processing engine 405 is configured for performing the method 200.

Figure 5:
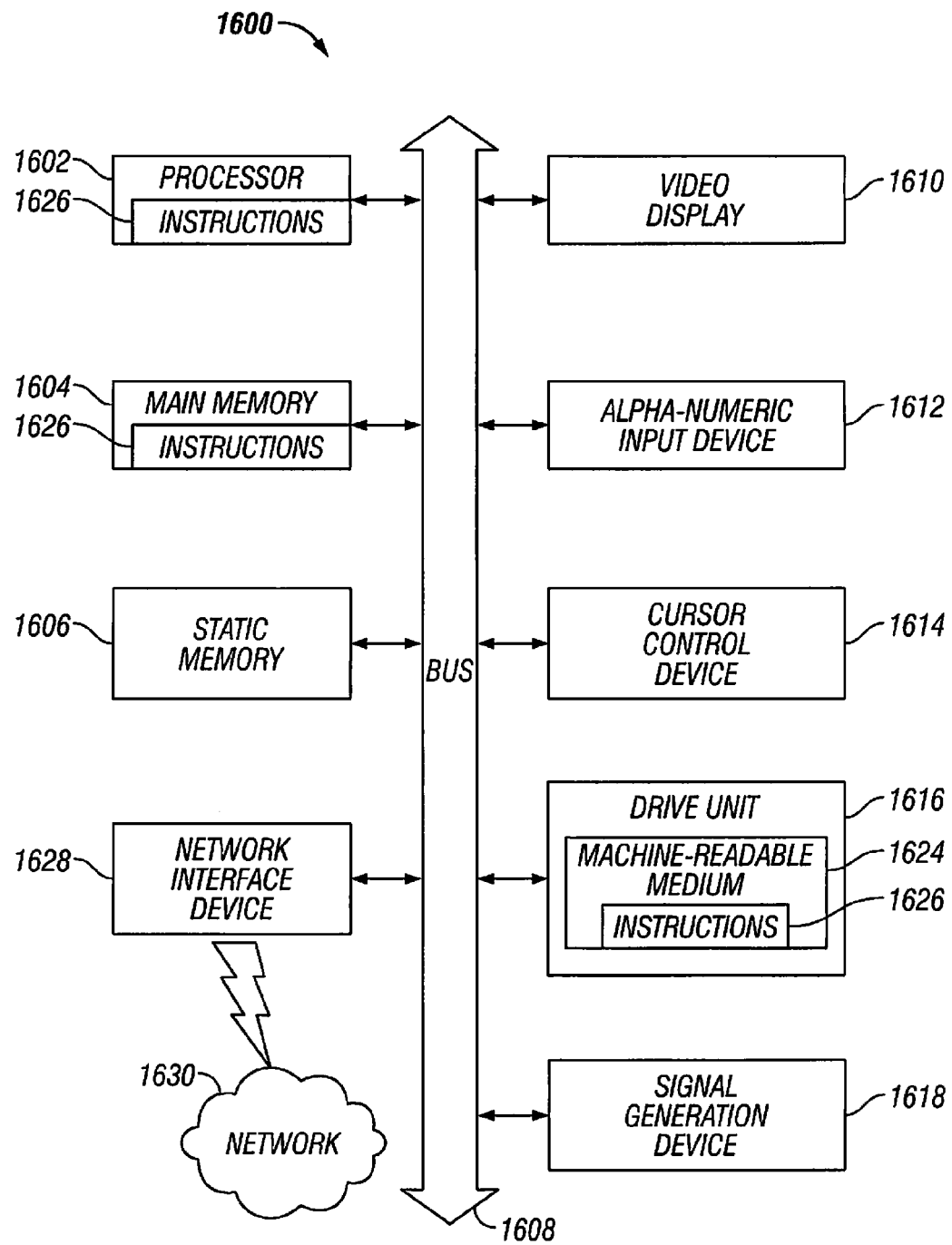
FIG. 5 is a block schematic diagram of a machine in the exemplary form of a computer system within which a set of instructions may be programmed to cause the machine to execute the logic steps of the invention.

FIG. 5 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A method of targeting speech and disregarding noise in an automatic speech extraction system comprising:
   accepting a voice signal in a system of automatic speech extraction;
   identifying the fundamental frequency of said voice signal;
   identifying one or more harmonics of said fundamental frequency;
   applying a filter to said fundamental frequency and said one or more harmonics, thereby attenuating energy other than harmonic energy and forming one or more harmonic-only signals;
   performing an amplitude modulation on said one or more harmonic-only signals, thereby forming one or more amplitude modulated harmonic-only signals;
   constructing one or more signal-to-noise ratios for said one or more amplitude modulated harmonic-only signals;
   disregarding one or more signals from among said one or more amplitude modulated harmonic-only signals whose signal-to-noise ratio falls below a threshold amplitude, thereby forming extracted amplitude patterns; and
   applying a bandpass filter to said extracted amplitude patterns, said bandpass filter having a range characteristic of human speech, thereby disregarding one or more signals from among said one or more amplitude modulated harmonic-only signals whose amplitude modulations are inconsistent with human speech;
   wherein a resultant signal is output.

2. The method of processing a voice signal according to claim 1, wherein the identifying the fundamental frequency of said voice signal further comprises providing a processor configured for processing said voice signal with a digital filter.

3. The method of processing a voice signal according to claim 2, wherein said digital filter comprises one or more adaptive narrow band filters configured to track the locally-strongest energy concentrations of said voice signal across the entire spectrum of said voice signal.

4. The method of processing a voice signal according to claim 3, further comprising:
   configuring said processor for selecting the locally-strongest energy concentration consistent with a harmonic series and selecting the frequency associated with said locally-strongest energy concentration as the fundamental frequency.

5. The method of processing a voice signal according to claim 4, further comprising:
   configuring said processor for selecting one or more additional locally-strong energy concentrations consistent with said harmonic series and selecting frequencies consistent with said harmonic series as harmonics of said fundamental frequency.

6. The method of processing a voice signal according to claim 3, wherein the configuring said one or more adaptive narrow band filters further comprises:
   generating an estimated center frequency;
   using said estimated center frequency to compute instantaneous frequency and amplitude of said voice signal, thereby providing a more precise center frequency; and
   replacing said estimated center frequency with said more precise center frequency.

7. The method of processing a voice signal according to claim 1, wherein the disregarding one or more signals from among said one or more amplitude modulated harmonic-only signals whose signal-to-noise ratio falls below a threshold amplitude further comprises:
   defining at least one wide band centered on the fundamental frequency and extending from substantially halfway to the next lower harmonic frequency and to substantially halfway to the next higher harmonic frequency;
   defining at least one narrow band centered on the fundamental frequency, wherein said narrow band's bandwidth is less than the wide band's bandwidth;
   computing a ratio of energy in the narrow band to energy in the wide band; and
   disregarding one or more signals from among said one or more amplitude modulated harmonic-only signals whose ratio of energy in the narrow band to energy in the wide band is higher than a threshold value.

8. The method of processing a voice signal according to claim 1, wherein the disregarding one or more signals from among said one or more amplitude modulated harmonic-only signals whose signal-to-noise ratio falls below a threshold amplitude further comprises:

estimating the frequency of one or more harmonics based on the fundamental frequency;

determining the actual frequency of the one or more harmonics observed in the identifying one or more harmonics of said fundamental frequency;

determining a deviation value between the estimated frequency of the one or more harmonics and the actual frequency of the one or more harmonics; and disregarding one or more signals from among said one or more amplitude modulated harmonic-only signals whose deviation value exceeds a predetermined value.

9. The method of processing a voice signal according to claim 1, wherein the disregarding one or more signals from among said one or more amplitude modulated harmonic-only signals whose signal-to-noise ratio falls below a threshold amplitude further comprises:

defining at least one wide band centered on the fundamental frequency and extending from substantially halfway to the next lower harmonic frequency and to substantially halfway to the next higher harmonic frequency;

defining at least one narrow band centered on the fundamental frequency, wherein said narrow band's bandwidth is less than the wide band's bandwidth;

computing a ratio of energy in the narrow band to energy in the wide band;

disregarding one or more signals from among said one or more amplitude modulated harmonic-only signals whose ratio of energy in the narrow band to energy in the wide band is higher than a threshold value;

estimating the frequency of one or more harmonics based on the fundamental frequency;

determining the actual frequency of the one or more harmonics observed in the identifying one or more harmonics of said fundamental frequency;

determining a deviation value between the estimated frequency of the one or more harmonics and the actual frequency of the one or more harmonics; and disregarding one or more signals from among said one or more amplitude modulated harmonic-only signals whose deviation value exceeds a predetermined value.

10. The method of processing a voice signal according to claim 1, wherein the disregarding one or more signals from among said one or more amplitude modulated harmonic-only signals whose amplitude modulations are inconsistent with human speech further comprises passing the amplitude modulations through a band pass filter with a range of 1 Hertz to 16Hertz.

11. An executable computer-readable medium having instructions stored thereon that, when executed, perform the method of claim 1.

12. An apparatus for processing a voice signal for automatic speech extraction comprising:

a voice signal input device configured for accepting a voice signal in a system of automatic speech extraction;

a processor operatively coupled with a memory device and with said voice signal input device, wherein said processor includes a plurality of processing modules comprising:

a harmonic frequency identifier configured for identifying the fundamental frequency of said voice signal;

a filter applicator configured for applying a filter to said fundamental frequency and said one or more harmonics, thereby attenuating energy other than harmonic energy and forming one or more harmonic-only signals;

a modulator configured for performing an amplitude modulation on said one or more harmonic-only signals to form one or more amplitude modulated harmonic-only signals;

a power ratio constructor configured for constructing one or more signal to noise ratios for said one or more amplitude modulated harmonic-only signals;

a low power harmonic remover configured for disregarding one or more signals from among said one or more amplitude modulated harmonic-only signals whose signal to noise ratio falls below a threshold amplitude, to form extracted amplitude patterns; and a non-speech harmonic remover comprising a bandpass filter having a range characteristic of human speech for application to said extracted amplitude patterns, wherein said non-speech harmonic remover is configured to disregard one or more signals from among said one or more amplitude modulated harmonic-only signals whose amplitude modulations are inconsistent with human speech; and a processed signal output.

13. The apparatus of claim 12, wherein the filter applicator is configured with one or more adaptive narrow band filters configured to track the locally-strongest energy concentrations of said voice signal across the entire spectrum of said voice signal.

14. The apparatus of claim 13, wherein the filter applicator is configured for selecting the locally-strongest energy concentration consistent with a harmonic series and selecting the frequency associated with said locally-strongest energy concentration as the fundamental frequency.

15. The apparatus of claim 14, wherein the filter applicator is configured for selecting one or more additional locally-strong energy concentrations consistent with said harmonic series and selecting frequencies consistent with said harmonic series as harmonics of said fundamental frequency.

16. The apparatus of claim 12, wherein the low power harmonic remover is further configured for defining at least one wide band centered on the fundamental frequency and extending from substantially halfway to the next lower harmonic frequency and to substantially halfway to the next higher harmonic frequency, defining at least one narrow band centered on the fundamental frequency, wherein said narrow band's bandwidth is less than the wide band's bandwidth, computing a ratio of energy in the narrow band to energy in the wide band, and disregarding one or more signals from among said one or more amplitude modulated harmonic-only signals whose ratio of energy in the narrow band to energy in the wide band is higher than a threshold value.

17. The apparatus of claim 12, wherein the low power harmonic remover is further configured for estimating the frequency of one or more harmonics based on the fundamental frequency, determining the actual frequency of the one or more harmonics observed in the identifying one or more harmonics of said fundamental frequency, determining a deviation value between the estimated frequency of the one or more harmonics and the actual frequency of the one or more harmonics, and disregarding one or more signals from among said one or more amplitude modulated harmonic-only signals whose deviation value exceeds a predetermined value.

18. The apparatus of claim 12, wherein the low power harmonic remover is further configured for defining at least one wide band centered on the fundamental frequency and extending from substantially halfway to the next lower harmonic frequency and to substantially halfway to the next higher harmonic frequency, defining at least one narrow band centered on the fundamental frequency, wherein said narrow band's bandwidth is less than the wide band's bandwidth, computing a ratio of energy in the narrow band to energy in the wide band, disregarding one or more signals from among said one or more amplitude modulated harmonic-only signals whose ratio of energy in the narrow band to energy in the wide band is higher than a threshold value, estimating the frequency of one or more harmonics based on the fundamental frequency, determining the actual frequency of the one or more harmonics observed in the identifying one or more harmonics of said fundamental frequency, determining a deviation value between the estimated frequency of the one or more harmonics and the actual frequency of the one or more harmonics, and disregarding one or more signals from among said one or more amplitude modulated harmonic-only signals whose deviation value exceeds a predetermined value.

19. The apparatus of claim 12, wherein said non-speech harmonic remover is configured for ignoring one or more signals from among said one or more amplitude modulated harmonic-only signals by passing the amplitude modulations through a band pass filter with a range of 1 Hertz to 16 Hertz.

20. A method of processing a voice signal for automatic speech extraction comprising:
   accepting a voice signal in a system of automatic speech extraction;
   identifying the fundamental frequency of said voice signal;
   identifying one or more harmonics of said fundamental frequency;
   applying a filter to said fundamental frequency and said one or more harmonics, thereby attenuating energy other than harmonic energy and forming one or more harmonic-only signals;
   performing an amplitude modulation on said one or more harmonic-only signals, thereby forming one or more amplitude modulated harmonic-only signals;
   constructing one or more signal-to-noise ratios for said one or more amplitude modulated harmonic-only signals;
   disregarding one or more signals from among said one or more amplitude modulated harmonic-only signals whose signal-to-noise ratio falls below a threshold amplitude, and further comprising:
   defining at least one wide band centered on the fundamental frequency and extending from substantially halfway to the next lower harmonic frequency and to substantially halfway to the next higher harmonic frequency;
   defining at least one narrow band centered on the fundamental frequency, wherein said narrow band's bandwidth is less than the wide band's bandwidth;
   computing a ratio of energy in the narrow band to energy in the wide band;
   disregarding one or more signals from among said one or more amplitude modulated harmonic-only signals whose ratio of energy in the narrow band to energy in the wide band is higher than a threshold value;
   estimating the frequency of one or more harmonics based on the fundamental frequency;
   determining the actual frequency of the one or more harmonics observed in the identifying one or more harmonics of said fundamental frequency;
   determining a deviation value between the estimated frequency of the one or more harmonics and the actual frequency of the one or more harmonics; and
   disregarding one or more signals from among said one or more amplitude modulated harmonic-only signals whose deviation value exceeds a predetermined value, thereby forming extracted amplitude patterns; and
applying a bandpass filter to said extracted amplitude patterns, said bandpass filter having a range characteristic of human speech, thereby disregarding one or more signals from among said one or more amplitude modulated harmonic-only signals whose amplitude modulations are inconsistent with human speech;
wherein a resultant signal is output.

* * * * *